United States Patent
Anders et al.

[11] Patent Number: 5,843,349
[45] Date of Patent: Dec. 1, 1998

[54] MULTI-COMPONENT EXTRUDER METHOD

[75] Inventors: Martin Anders, Schellerten; Engelbert Gerhard Martin Harms; Axel Schmeitz, both of Aachen, all of Germany

[73] Assignee: Uniroyal Englebert Reifen GmbH, Aachen, Germany

[21] Appl. No.: 610,498

[22] Filed: Mar. 4, 1996

[30] Foreign Application Priority Data

Mar. 4, 1995 [DE] Germany .................. 195 07 598.6

[51] Int. Cl.⁶ ............... B29C 47/56; B29C 47/92
[52] U.S. Cl. ............ 264/40.5; 264/40.6; 264/40.7; 425/140; 425/145
[58] Field of Search ................ 264/40.1, 40.5, 264/40.6, 40.7; 425/140, 141, 145

[56] References Cited

U.S. PATENT DOCUMENTS

| | | | |
|---|---|---|---|
| 4,087,499 | 5/1978 | Bayonnet . | |
| 4,088,721 | 5/1978 | Apicella, Jr. . | |
| 4,097,566 | 6/1978 | Bertin et al. . | |
| 4,428,896 | 1/1984 | Stevenson | 264/40.1 |
| 4,515,738 | 5/1985 | Anders | 425/140 |
| 4,671,908 | 6/1987 | Gwinn et al. | 264/40.1 |
| 4,719,071 | 1/1988 | Capelle | 264/40.5 |
| 4,754,413 | 6/1988 | Koster et al. | 264/40.5 |
| 4,844,846 | 7/1989 | Peterson, Jr. et al. . | |
| 5,128,077 | 7/1992 | Stevenson et al. . | |

FOREIGN PATENT DOCUMENTS

| | | |
|---|---|---|
| 0011355 | 5/1980 | European Pat. Off. . |
| 3315184 | 6/1984 | Germany . |
| 3434904 | 10/1985 | Germany . |
| 3512398 | 4/1986 | Germany . |
| 3526050 | 1/1987 | Germany . |
| 3534734 | 4/1987 | Germany . |
| 3915279 | 11/1990 | Germany . |
| 2269032 | 11/1990 | Japan . |
| 427518 | 1/1992 | Japan . |
| 1370006 | 10/1974 | United Kingdom . |
| 8403146 | 8/1984 | WIPO . |

OTHER PUBLICATIONS

W. Green et al; "Prozessgesteuerte . . . Laufstreifenanlagen"; Kautschuk + Gummi; vol. 38; No. 3/85.

*Primary Examiner*—Mathieu D. Vargot
*Attorney, Agent, or Firm*—Robert W. Becker & Associates

[57] ABSTRACT

A multi-component extruder for producing a multi-component profiled member has at least two individual extruders for extruding a single-component profiled member. Each individual extruder has a housing with a chamber for receiving the extrudable material and an extruder shaft rotatably supported in the chamber. Each individual extruders has an extruder mold nozzle for continuously extruding the single-component profiled member. The individual extruders are equipped with devices for measuring pressure and temperature. A common extruder head has a confluence zone in which the extruder nozzles are arranged to combine the single component profiled members to the multi-component profiled member. A device for measuring the multi-component profiled member is provided. A control device is provided for individually controlling the number of revolutions of each individual extruder according to a preset nominal value based on the nominal characteristic value of the multi-component profiled member, on the extrudable materials, and on the extrusion mold nozzles. The control unit serves to control the actual number of revolutions upon detecting deviations of the measured characteristic value of the multi-component profiled member from a nominal characteristic value as a function of detected deviations of the measured values for temperature and pressure within the individual extruders from nominal pressure values and temperature values.

6 Claims, 3 Drawing Sheets

MULTI-COMPONENT EXTRUDER METHOD

BACKGROUND OF THE INVENTION

The present invention relates to a multi-component extruder for producing multi-component profiled members of thermoplastic material and/or other intrinsically viscous materials, especially rubber profiled members, as well as a method for controlling the composition of a continuous multi-component mass flow produced within a multi-component extruder for thermal plastic materials and/or other intrinsically viscous materials by combined extrusion of at least two individual component mass flows produced in individual extruders of the multi-component extruder.

It is known, for producing products which are comprised of different profiled members, to manufacture the individual profiled members with extrusion devices. It is furthermore known to produce multi-component profiled members from jointly extruded individual components of different materials whereby a plurality of individual extruders convey the mass flow of one individual component into a common extruder head. Within the extruder head individual nozzle molds for the individual profiled members of the individual components are provided. In the extruder head the individual profiled members are combined and form thus a multi-component profiled member exiting from the extruder head. Due to the complexity of the adjustment of such multi-component extrusion devices the operator needs to be very experienced in order to be able to operate the device such that the amount of reject material, i.e., profiled members the dimensions of which do not comply with the required tolerances, is as low as possible. On the other hand, it is more and more desirable to realize great flexibility of the extrusion device and to increase the number of degrees of freedom with respect to development and design of the multi-component profiled members. This additionally requires more knowledge and experience of the operator.

In known multi-component extrusion devices, at certain intervals a section is cut out of the produced multi-component profiled member, geometrically measured and weighed in order to check the resulting combined mass flow of the produced multi-component profiled member. Such measurements are performed at certain time intervals and provide limited, i.e., spot-wise, information with respect to the produced mass flow, respectively, the multi-component profiled member. For example, the operator, upon detecting too little mass with such a measurement, may gain the information that the mass flow at this point in time is too low, respectively, that the multi-component profiled member is too small. A continuous information with respect to changes of the total mass flow respectively, the entire multi-component profiled member cannot be provided. Each measurement disrupts the flow of material, is time consuming, and requires considerable expenditure, and also provides only information with respect to deviations of the total mass flow. When the operator detects mass flows in such devices that are too low, respectively, multi-component profiled members that are too small, the number of revolutions of the individual extruders is increased uniformly percentage wise for all individual extruders at the same time. Correspondingly, the number of revolutions of all individual extruders upon detecting of mass flows that are too high, respectively, multi-component profiled members that are too large, is simultaneously and uniformly lowered percentage wise. With such multi-component extrusion devices the operator cannot obtain information with respect to deviations of the individual mass flows, respectively, the dimensions and weight of the different single-component members and thus with respect to the differences of composition of the complete mass flow, respectively, the entire multi-component profiled member. The operator also does not obtain information with respect to how deviations of the single-component members affect deviations of the complete mass flow, respectively, the multi-component profiled member. When only one individual mass flow deviates from the desired mass flow of this component, the operator, after measuring the complete mass flow, respectively, the multi-component profiled member by weighing only obtains the information that the complete mass flow, respectively, the multi-component profiled member has changed. With such multi-component extrusion devices, as already mentioned before, the number of revolutions of all individual extruders is then changed. Accordingly, for a deviation of only one of the individual mass flows or of a single component of the entire multi-component profiled member from the nominal value of this individual mass flow, respectively, of this single-component profiled member, it is not the individual mass flow that is adjusted to the respective individual nominal value, but the other individual mass flows are also changed from their correctly adjusted nominal value because of the uniformly performed adjustment of the number of revolutions of all individual extruders to an incorrect value of individual mass flow, respectively, of the single-component profiled member. The composition of the multi-component mass flow, respectively, of the entire multi-component profiled member thus remains incorrect.

The product quality of such multi-component extrusion devices is, due to the lack of reliability with respect to the compositional proportions of the individual mass flows, thus reduced.

It is therefore an object of the present invention to provide a multi-component extruder as well as a method for controlling the composition of a continuous multi-component mass flow or profiled member, produced with a multi-component extruder by combining at least two single-component profiled members produced in individual extruders of the multi-component extruder, with which a more uniform quality of the extruded product is afforded.

SUMMARY OF THE INVENTION

The multi-component extruder for producing a multi-component profiled member of extrudable material according to the present invention is primarily characterized by:

At least two individual extruders for extruding a single-component profiled member;

Each one of the individual extruders comprising a housing with a chamber for receiving an extrudable material;

Each one of the individual extruders further comprising an extruder shaft rotatably supported in the chamber;

Each one of the individual extruders further comprising a controllable drive means for driving the extruder shaft;

Each one of the individual extruders further comprising an extruder nozzle for continuously extruding therethrough the extrudable material as the single-component profiled member with a mass flow $m_i$;

Each one of the individual extruders further comprising means for measuring pressure and temperature within each one of the individual extruders;

A common extruder head having a confluence zone in which the extruder nozzles are arranged such that the single-component profiled members are combined to the multi-component profiled member with a mass flow $m_G$, wherein $m_G = \Sigma m_G = \Sigma m_i$;

Means for measuring downstream of the confluence zone the multi-component profiled member; and A control device for:

a) individually controlling a number of revolutions $n_i$ of each one of the individual extruders according to a preset nominal value of the number of revolutions $n_{i(nominal)}$ of each one of the individual extruders which preset nominal value is determined based on the nominal characteristic value $m_{G(nominal)}$ of the multi-component profiled member, on the extrudable materials, and on the extrusion nozzles and b) controlling an actual number of revolutions $n_{i(actual)}$ upon detecting deviations of the measured characteristic value $m_{G(mes)}$ of the multi-component profiled member from the nominal characteristic value $n_{G(nominal)}$ based on detected deviations of measured values $P_{(mes)}$, $T_{(mes)}$ for pressure and temperature within the individual extruders from nominal pressure values $P_{(nominal)}$ and temperature values $T_{(nominal)}$ within the individual extruders.

The present invention also relates to a method for controlling the composition of a multi-component profiled member including the following steps:

Extruding at least two single-component profiled members in respective individual extruders;

Combining the single-component profiled members to a continuous multi-component profiled members in a common extruder head;

Measuring actual temperature values $T_{(nes)}$ and actual pressure values $P_{(nes)}$ within each one of the individual extruders;

Comparing the actual temperature values $T_{(nes)}$ and the actual pressure values $P_{(nes)}$ of each one of the individual extruders to nominal temperature values $T_{(nominal)}$ and nominal pressure values $P_{(nominal)}$ of each one of the individual extruders;

Determining deviations of the multi-component profiled member from a nominal characteristic value $m_{G(nominal)}$; and Adjusting that one of the individual extruders where the actual temperature values $T_{(nes)}$ and actual pressure values $P_{(nes)}$ deviate from the nominal temperature values $T_{(nominal)}$ and nominal pressure values $P_{(nominal)}$.

Advantageously, the method further includes, for a deviation of the at least one actual characteristic value of the multi-component profiled strip from the nominal characteristic value of the multi-component profiled member, the step of adjusting the mass flow of the single-component profiled member of that one of the single extruders in which an average pressure value of the actual pressure values measured at at least two pressure measuring locations and the actual temperature value measured at at least one temperature measuring location deviate from an average nominal pressure value and from the nominal temperature value.

Advantageously, for adjusting the individual extruder the number of revolutions of the individual extruder is adjusted.

In another embodiment of the present invention the method further includes the step of saving actual values of the number of revolutions of the individual extruders for multi-component batch processes in conjunction with identification information for the multi-component extruder, for the extruded material, and the resulting multi-component profiled member, and further includes the step of programming the multi-component extruder with the saved actual values of the number of revolutions as nominal values for a new multi-component batch process having the same composition of components, the same distribution of comoponents within the individual extruders, and a substantially identical multi-component profiled member.

Preferably, at the beginning of a multi-component batch process the multi-component profiled member is measured and the measured characteristic values are compared to nominal characteristic values of the multi-component profiled member, wherein, upon coinciding of the nominal characteristic values and the actual characteristic values, at a plurality of predetermined locations the actual temperature values and the actual pressure values within at least one individual extruder are detected, wherein the actual pressure values are averaged, and wherein the actual temperature values and the actual averaged pressure values are compared to the nominal temperature and nominal values pressure values for the extruded material, known for the selected value of the number of revolutions of the individual extruder and for the selected characteristic value of the multi-component profiled member, in order to check the identity of the material present within the extruder with the desired material to be processed.

Preferably, a correlation of the averaged pressure values and the actual temperature values, when the actual mass flow is identical to the nominal mass flow, to known material-typical averaged pressure values and actual temperature values, determined for known materials in the extruder in connection with a certain mold nozzle, is carried out for determining the material present within the extruder.

For controlling the number of revolutions of the worm gears of the individual extruders deviations of a measured value for the size, width, and/or weight of the multi-component profiled member are detected and the mass flow of the individual extruder is adjusted by changing the number of revolutions or the velocity of the multi-component extruder with a control device until the nominal value of the respective measured value for size, width, and/or weight of the multi-component profiled member is reached.

By measuring the resulting total mass flow, respectively, the multi-component profiled member, for example, by width and/or weight measurement, deviations in the total mass flow, respectively, in the multi-component profiled member can be detected by comparison to the nominal value for the total mass flow or the multi-component profiled member, for example, of width and weight at easily accessible locations downstream of the extruder head. For determining the changes of the individual mass flows or of the single-component profiled members of the multi-component profiled member, qualitative information with respect to the measured (actual) pressure and temperature values of each individual extruder are being used. A change of the individual mass flow coincides with changing pressure and temperature values within the respective individual extruder. Even though the values for pressure and temperature, which are measured within one individual extruder, will not allow for exact information within permissible expenditure limits in regard to the magnitude of change of the individual mass flows due to the complex processes and interactions within the multi-component extruder, the determined deviations of pressure and temperature can however be used as a qualitative measure of change of the mass flow of the individual extruder. Even though it is not possible only with the aid of pressure and temperature values and with a limited expenditure to exactly control mass flows of the individual extruders, it is, however, possible in connection with the measured total mass flow, respectively, the multi-component profiled member, to detect which one of the individual extruders produces a changed mass flow with detected deviations of the total mass flow from the nominal values for the total mass flow, respectively, the multi-component profiled member based on temperature and pressure values measured within the individual extruders. According to this information and the measured profiled member values and weight values, the number of revolutions of this individual extruder is correspondingly increased or decreased until the measured value for the total mass flow, respectively, the multi-component profiled member corresponds to the nominal value for the mass flow, respectively, multi-component profiled member. In this manner, the composition of the multi-component profiled member comprised of the individual single-component mass flows, respectively, profiled member can be made more uniform with limited expenditure. Since the measurement of total mass flow, respectively, multi-component profiled member with respect to width and weight measurement, pressure and temperature can be carried out continuously, a continuous control of the composition is possible and the profiled member can be made more uniform in a continuous fashion.

Since the pressure values within an individual extruder show deviations, it is preferred to use averaged pressure values measured at a plurality of measuring locations and to use pressure values and temperature values of different measuring locations for checking the deviation of the individual mass flows from their nominal values. Preferably, the pressure values within the area of the worm gear of the individual extruder are used and the temperature values in the area of the extruder nozzle are used. In this manner, especially reliable information can be achieved.

Preferably, the mass flow is controlled by adjusting the number of revolutions of the individual extruders.

By saving the adjusted and controlled numbers of revolution for the individual extruders in connection with the resulting total mass flows, respectively, the resulting multi-component profiled member for a preselected composition of the multi-component profiled member from the individual components of the individual extruders, upon repeating an identical batch process in the same multi-component extruder with the same extruding mold nozzle a product of good quality with respect to the composition of the individual components can be achieved already very early within the batch process, i.e., directly after start-up of the new batch process without requiring long adjusting periods, by preselecting the saved number of revolutions of the previous batch process as the initial number of revolutions of the individual extruder. In the subsequent batch process the total mass flow, for example, the width and weight of the multi-component profiled member, as well as the pressure and temperatures within the individual extruders are measured in order to control the process of combining of the individual mass flows to the total mass flow, respectively, to the multi-component profiled member. The measured values for the controlled number of revolutions of this subsequent batch process will be used as nominal values for a subsequently performed batch process. The control thus is carried out with an intelligent ("learning") system.

By saving the pressure and temperature values which are detected during the production process within the individual extruders, when repeating such a batch process with an identical or a similar number of revolutions and identical or similar materials, it can be checked after determination of the identity of the total mass flow with the desired total mass flow, by measuring the pressure and temperature values within an individual extruder, whether considerable deviations for pressure and temperature values relative to the pressure and temperature values of known batch processes occur for the same type of batch process. By comparing the pressure and temperature values, it can be checked whether the desired material is present within the extruder.

When great deviations of pressure and temperature values are determined within one individual extruder relative to the nominal pressure and temperature values for an unchanged, constant total mass flow, an approximate correlation to the actually processed material can be achieved by comparing the measured pressure and temperature values with known temperature and pressure values for other materials in this individual extruder for the same resulting total mass flow and the same known extrusion mold nozzle. Due to the different viscosities and other material properties, typical temperature and pressure value ranges can be detected for each material at preselected mass flows and number of revolutions of an extruder with a certain extrusion mold nozzle. Due to this behavior, it is possible, at least for a limited selection of materials generally used, to provide a correlation between the measured pressure and temperature values within an individual extruder to a material having typical pressure and temperature values corresponding to the ones measured at present, provided the resulting total mass flow in the individual extruder and the extrusion mold nozzle are identical. In this manner, at the beginning of a batch process the material can first be checked with regard to its proper identity and, if it is determined that the wrong material is being used, the actually processed material can be determined. When identity of the material has been confirmed, the constant mass flow is checked by continuously measuring the profiled member. When deviations of the checked total mass flow, respectively, of the multi-component profiled member, checked by measuring the strip width and weight, occur, individual extruders can be adjusted with respect to the number of revolutions until the total mass flow corresponds to the nominal value of the total mass flow, respectively, the nominal shape or size of the multi-component profiled member by detecting deviations of pressure and temperature values of the respective individual extruder. In this manner, a continuous automated quality insurance of the component composition of a multi-component extruder product can be largely ensured.

The use of the measured values for size and/or width and/or weight of the extruded profiled member is especially advantageous, because it is simple and reliable, for controlling the number of revolutions of the worm gears of the individual extruders. The mass flow of an individual extruder is proportional to the weight of the profiled member and the width of the profiled member. Upon deviations of one of the two measured values, the nominal value must be again achieved by changing the number of revolutions of the worm gear or the velocity of the device with a control unit. For multi-component profiled members the deviation of the single component profiled member is checked with corresponding known width measuring methods and can be corrected optionally by changing the number of revolutions of the worm gear.

BRIEF DESCRIPTION OF THE DRAWINGS

The object and advantages of the present invention will appear more clearly from the following specification in conjunction with the accompanying drawings, relating to a multi-component extruding device for producing tread strips with cap, base, and shoulder strips for a pneumatic vehicle tire, wherein the drawings show in.

DESCRIPTION OF PREFERRED EMBODIMENTS

The present invention will now be described in detail with the aid of several specific embodiments utilizing FIGS. 1 through 3.

Figure 1:
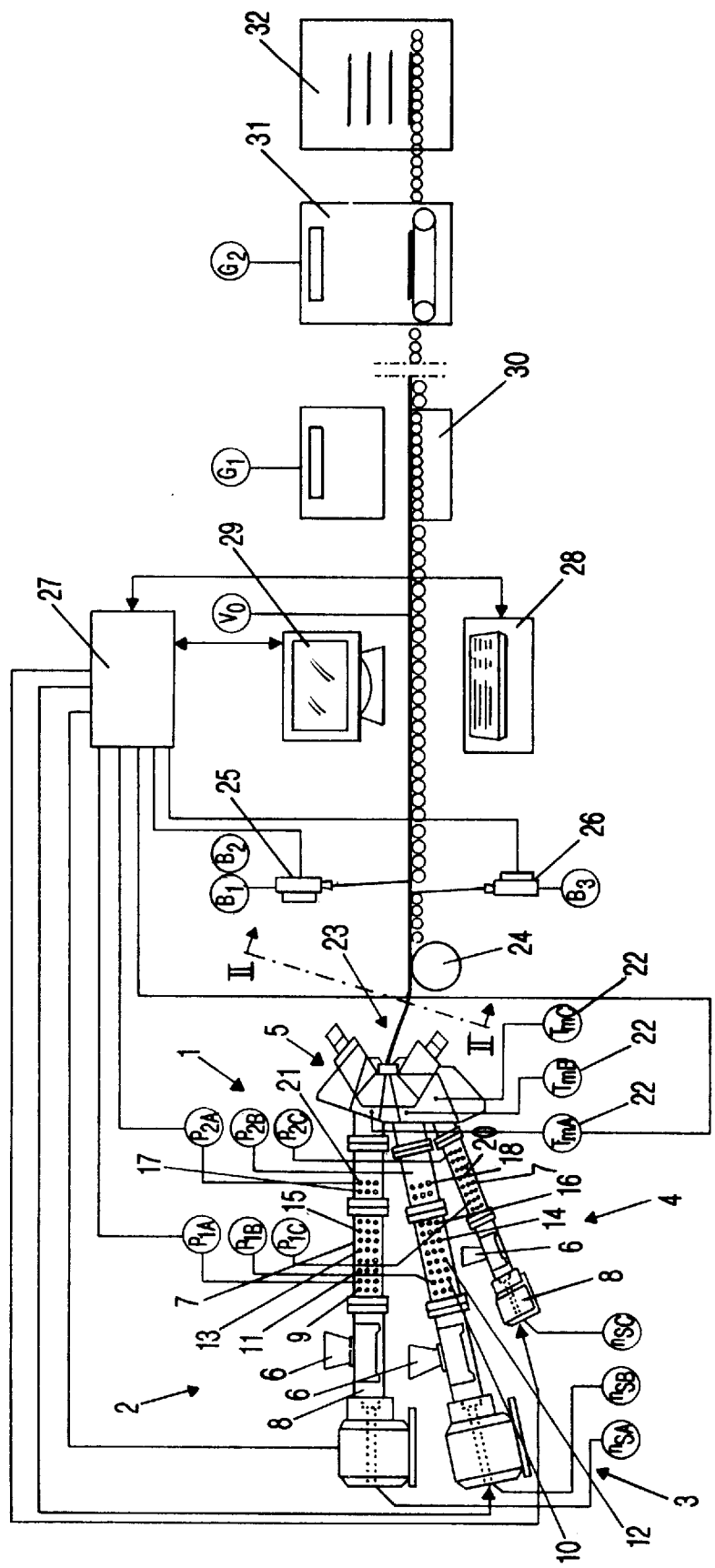
FIG. 1 a schematic representation of the inventive multi-component extrusion device.
Figure 2:
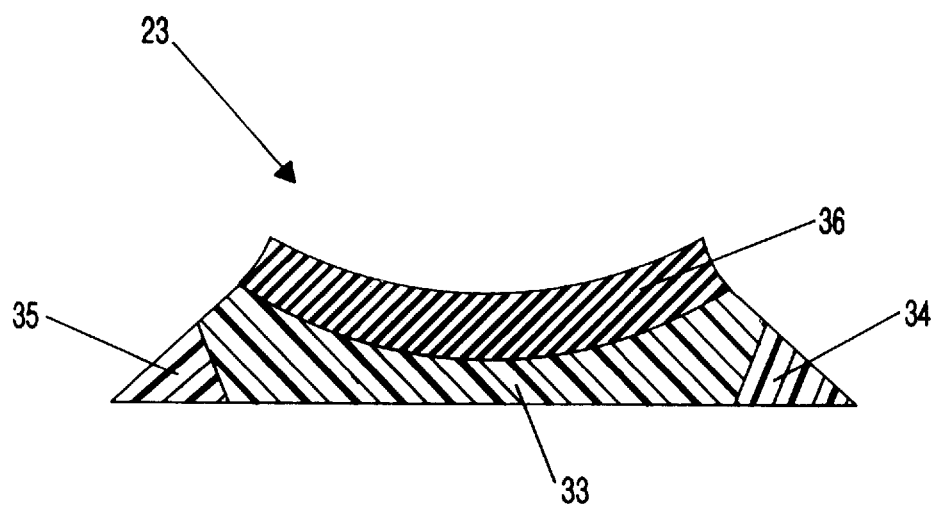
FIG. 2 a cross-sectional view of the co-extruded tread strip.

FIG. 1 shows a three-component extruder 1 of a known design with individual extruders 2, 3, 4. The individual extruders 2, 3, 4 are known pin extruders as, for example, disclosed in German Patent 31 50 719. They comprise a housing 7 in which an extruder shaft 8 is rotatably supported and which in the area of the housing 7 is in the form of a worm gear. With filling funnels 6 a rubber mixture is introduced into the interior of the housing and is removed by the worm gear of the extruder shaft 8 from this area, is compressed, mixed, and homogenized and extruded within the extruder head 5 that is common to the three individual extruders 2, 3, 4 through mold nozzles (not represented) belonging to the individual extruders. The three individual single-component mass flows produced by the three individual extruders 2, 3, 4 are combined due to the position of the individual mold nozzles within the extruder head such that a common multi-component mass flow (profiled member) 23 results. As shown in FIG. 2, the extruder 2 produces from a suitable rubber mixture a cap 36 with material properties required for direct street surface contact 36, the extruder 3 produces the base 33 positioned under the cap 36 and functioning as a dampening material layer, and the extruder 4 produces on both sides of the base 33 the shoulder strips 34 and 35.

The individual extruders 2, 3 and 4 in the shown embodiment have in the area of the housings 7 ten rows of extruder pins 9 to 18 arranged adjacently in the direction of the extruder axis. The extruder pins are distributed over the circumference of the housing and extend radially inwardly relative to the axis of the worm gear. These extruder pin rows 9 to 18 serve to mechanically and thermally homogenizing the mixture to be extruded and are connected within the housing in a manner known per se. With the aid of a removing roller 24 the combined tread strip 23 is continuously removed from the extruder head. In the direction of conveyance downstream of the extruder head, cameras 25, 26 of a known design are provided above and below the tread strip for determining the width $B_1$, $B_2$, $B_3$ of the tread strip, respectively, of the individual components of the multi-component profiled member. The cameras are connected to a control unit 27. In the area of the second extruder pin row 10 and of the tenth extruder pin row 18 pressure sensors 20 and 21 of a known design are arranged within each one of the individual extruders 2, 3 and 4 for determining the pressure within each individual extruder 2, 3, 4. The sensors 20 and 21 of each extruder 2, 3, 4 are connected in a known manner to the control unit 27. Within the extruder head temperature sensors 22 of a known design are arranged in a manner known per se within each one of the individual extruders 2, 3, and 4 for determining the temperature of the rubber mixture within the mold nozzle area. The temperatures sensors 22 of each extruder 2, 3, 4 are connected in a manner known per se to the control unit 27.

At the beginning of an extrusion batch process, the values for the desired total mass flow, as well as the corresponding initial numbers of revolutions for the extruder worm gear 8 of the individual extruders 2, 3, 4 are input manually via the operator console 28 into the control unit 27 together with known values for the pressures P1a, P1b, P1c at the first pressure measuring location which is at the second extruder pin row 10 as well as for the second pressure measuring values P2a, P2b, P2c for each second pressure measuring location which is located within the tenth extruder pin row of each individual extruder. Also, the known temperature values for the expected temperature within the extruder head are input for the individual extruders. After loading material into the funnels, the extruder worm gears 8 of the individual extruders 2, 3, 4 are adjusted by the control unit 27 to the desired nominal numbers of revolutions $n_{sa}$, $n_{sb}$, $n_{sc}$. The extruded product that is formed within the extruder head is removed with the aid of the removing roller 24 from the extruder head and is measured with respect to its width by the cameras 25, 26. Due to the detected width as a measure for the volume of the individual components and of the removal velocity, the control unit determines the total mass flow, respectively, the dimensions of multi-component profiled member in the area of the width measuring device. Upon deviations of the actual characteristic values of the total mass flow $m_G$, respectively, of the multi-component profiled member from the nominal characteristic values of the total mass flow, respectively, of the multi-component profiled member, the continuously measured width values (as a characteristic value), the actual pressure values at the first and second measuring locations of all three extruders as well as the measured actual temperature values of all three extruders are compared with the nominal width, pressure, and temperature values. For achieving more uniform results, the averaged value for the pressure values is determined from the measured actual pressure values at the two measuring locations of each extruder and compared to the averaged nominal pressure value. Upon deviations of the width of the individual components of the multi-component profiled member from the nominal width beyond a predetermined tolerance range, the control unit 27 changes the number of revolutions of this extruder as a function of the determined deviation of pressure and temperature from the respective nominal values. The adjustment of the number of revolutions is carried out continuously while the width is constantly measured with the aid of the cameras 25 and 26.

When the measured width as an indicator for the mass flow coincides with the corresponding nominal width of the nominal mass flow, the adjustment of the number of revolutions of the extruder is stopped. By constantly controlling the width of the mass flow as an indicator for the mass flow and by changing, after determination of a mass flow change, the number of revolutions of an individual extruder upon detecting deviations of the measured actual pressure and temperature values for this individual extruder, a constant control and constant maintenance of the total mass flow by changing the respective individual mass flow, which has caused the initial change of the total mass flow of the multi-component profiled member, is possible.

For checking the total mass flows, as well as for checking and correcting the width measurement as a indicator for the mass flow, it is possible to provide along the path of the mass flow additionally a strand scale 30 of known design. With this measure, based on the removal velocity and the width of the multi-component profiled member while ignoring height fluctuations, the volume stream can be calculated first, by additionally neglecting minimal density fluctuations, the mass flow can be calculated with the respective mass of the material. It is also possible, after cutting the tread strip into sections that are suitable for further processing, to provide a scale 31 for weighing the individual sections in order to control the previously calculated results. Neither the strand scale 30 nor the scale 31 provide for information with regard to the composition of the multi-component profiled member; however, they can do so in connection with the shrinking behavior of the profiled member. The cut tread strip sections can be stored in a manner known per se in a storage facility, for example, in a booking station of known design 32.

By saving, for example, in the computer control unit 27, all determined values for numbers of revolutions, temperature, average pressure for each individual extruder in connection with the used extrusion mold nozzles and materials that have been extruded as well as the resulting total mass flow, respectively, multi-component profiled members with their characterisitc values such as width and weight, it is possible to provide comprehensive information for subsequent batch processes. For example, at the beginning of a new batch process it is possible for a known three-component extruder according to FIG. 1, in which the actual number of revolutions coincides with the nominal value and in which the mold nozzle is identical to the desired one, after checking the identity of the resulting total mass flow and the desired nominal total mass flow with the cameras 25 and 26, respectively, the desired dimensions of the multi-component profiled member width by comparison to the respective nominal values, to detect mistakes with respect to the material processed within the extruder by comparing the measured values for averaged pressure and for temperature in each individual extruder 2, 3, 4 with the respective known comparative values for pressure and temperature when considerable deviations of the temperature and pressure values are observed within one of the extruders 2, 3, 4. Thus, already at the beginning of a batch process it is possible to detect at least a misleading of the extruder with wrong material when considerable deviations of the pressure and temperature are detected, to show the misloading on a monitor, and to thereby be able to correct the mistake by changing the material.

Figure 3:
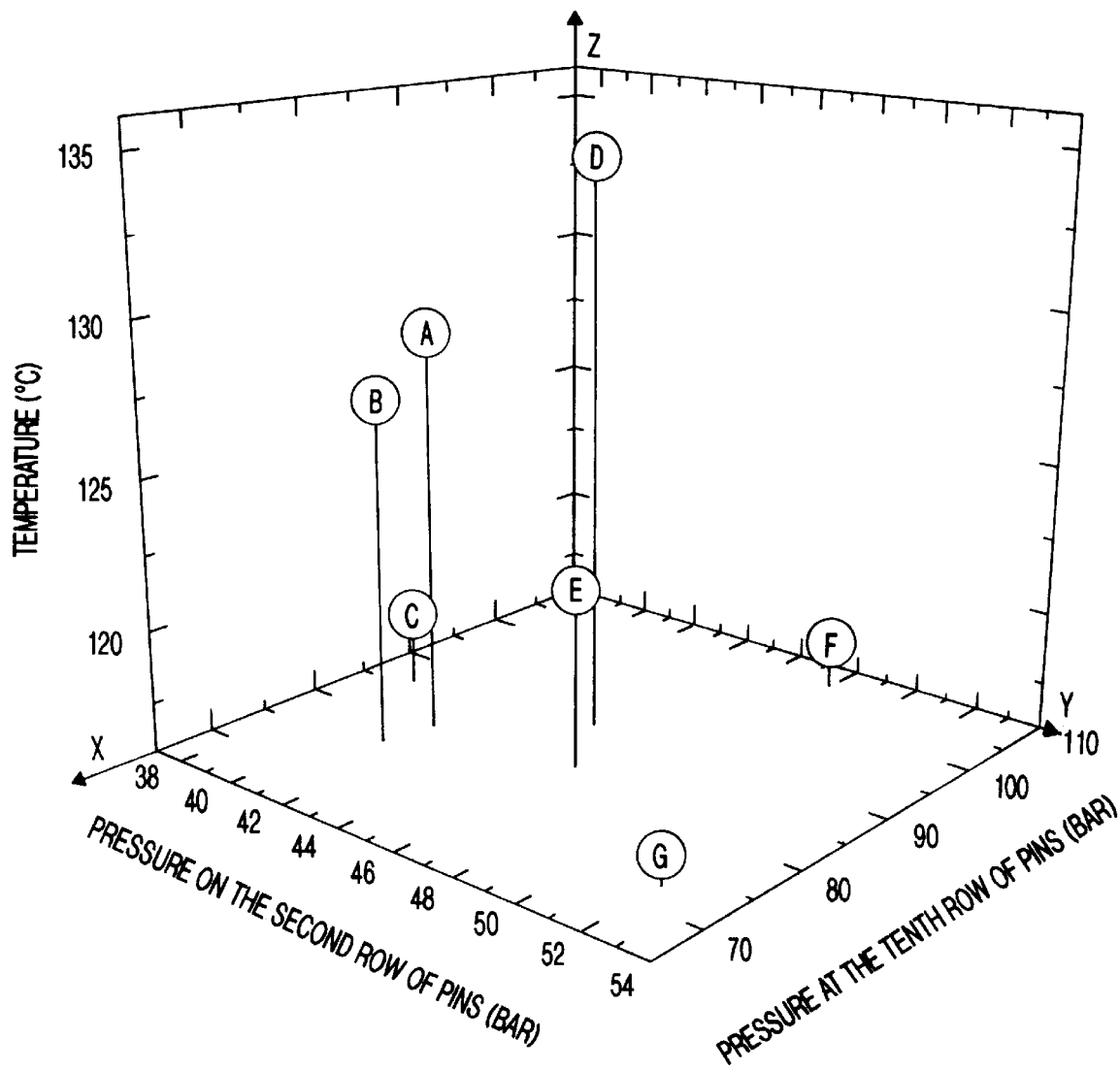
FIG. 3 a correlation diagram for correlating determined pressure and temperature values to certain materials in a qualitative representation.

As represented in FIG. 3 as an exemplary embodiment, for each individual extruder 2, 3, 4, for each batch process performed a diagram can be produced in a space diagram with a carthesic coordinate system x-y-z, whereby the x-axis provides information with regard to pressure at the tenth row of pins, the y-axis provides information in regard to pressure values for pressure at the second row of pins, and the z-axis provides the temperature values within the extruder. This diagram shows a fixed correlation of different materials, for example, A, B, C, D, E, F, G to typical ranges of temperature and pressure. Based on this diagram, after determining that a wrong material has been fed into the individual extruder, it can be checked whether the determined values for pressure and temperature can be correlated to a known material within the diagram. In this manner, it is possible to determine, at least for a certain given number of different materials to be used with the extruder, the identity of misloaded material based on the diagram of the known materials.

The multi-component extruder according to the representation of FIG. 1 can also be used as an intelligent system. The saved values for the controlled actual number of revolutions of the individual worm gears of a previous batch process can be used as the nominal values for the number of revolutions for a subsequent batch process. It is possible to use the saved number of revolutions for identical batch processes in order to thus achieve a good quality of the product composition already at the beginning of the batch process. It is also possible to use the already known saved number of revolutions as approximate start-up values for a new extrusion batch process for similar batch processes. Of course, with the measurement of the width of the profiled member, continuous checking of the total mass flow, respectively, of the multi-component profiled member as well as with a continuous checking of pressure and temperature, a possible adjustment of the number of revolutions of the individual extruders can be performed upon changes within the total mass flow.

It is also possible to save the percentage-wise changes of the number of revolutions relative to the initial number of revolutions of each individual extruder for a certain predetermined three-component extruder when subsequent batch processes deviate in a certain pattern form a respective initial batch process in order to directly adjust in a following series of comparable batch process the percentage-wise changes of the number of revolutions between the individual extrusion batch processes of a series. For example, it is possible that a first batch process of a first series of different batch processes requires adjustment of all three extruders 2, 3 and 4 to respective nominal numbers of revolution $n_{sa}$, $n_{sb}$, $n_{sc}$. After changing the extrusion mold nozzle for extruder 2 in a second batch process of a first series of batch processes, a reduction of the number of revolutions to 80% of the first number of revolutions $n_{sa1}$ is required for the extruder 2, i.e., $n_{sa2}$, in order to achieve the preset total mass flow, respectively, the desired multi-component profiled member. Upon repetition of this series of batch processes, the control unit 27 first adjusts for the first batch process of the second series the number of revolutions $n_{sa1}=100\%$ and for the second batch process the number of revolutions $n_{sa2}$ to 80% of $n_{sa2}$.

It is also possible to provide a shrinking station in the area of the width measurement and of the strand scale 30. The product produced by extrusion is warm and shrinks upon cooling. Upon measuring the degree of shrinkage at the strand scale 30 in relation to the scale 31, that measures individual sections, for each batch process the degree of shrinking can be determined and saved within the computer of the control unit 27. For comparable subsequent batch processes the thus to be expected degree of shrinkage is preset and the values for mass flows, respectively, dimensions of the profiled member are determined such that the shrinkage to be expected is used as an additional parameter for the nominal mass flow. Thus, a nominal mass flow is calculated which is increased by the predetermined degree of shrinkage.

The present invention is, of course, in no way restricted to the specific disclosure of the specification and drawings, but also encompasses any modifications within the scope of the appended claims.

What we claim is:

1. A method for controlling the composition of a multi-component profiled member, said method comprising the steps of:

extruding at least two single-component profiled members in respective individual extruders;

combining the single-component profiled members to a multi-component profiled member in a common extruder head;

measuring actual temperature values and actual pressure values within each one of said individual extruders;

comparing the actual temperature values and the actual pressure values of each one of said individual extruders to nominal temperature values and nominal pressure values of each one of said individual extruders;

measuring the width of the single-component profiled members of the multi-component profiled member for determining deviations of the measured width from a nominal width;

adjusting that one of said individual extruders where the actual temperature values and actual pressure values deviate from the nominal temperature values and nominal pressure values; and controlling a mass flow of that one of said individual extruder, for which deviations of the measured width from the nominal width have been detected by changing the number of revolutions or the velocity of the individual extruder until the nominal width of the single-component profiled member is reached.

2. A method according to claim 1, wherein in the step of adjusting that one of said individual extruders is adjusted where an average pressure value of the actual pressure values measured at at least two pressure measuring locations and the actual temperature value measured at at least one temperature measuring location deviate from an average nominal pressure value and from the nominal temperature value.

3. A method according to claim 1, wherein in the step of adjusting the number of revolutions of the individual extruder is adjusted.

4. A method according to claim 3, further including the step of saving actual values of the number of revolutions of the individual extruders for multi-component batch processes in conjunction with identification information for the multi-component extruder, for the extruded material, and the resulting multi-component profiled member, and further including the step of programming the multi-component extruder with the saved actual values of the number of revolutions as nominal values for a new multi-component batch process having the same composition of components, the same distribution of components within the individual extruders, and a substantially identical multi-component profiled member.

5. A method according to claim 3, wherein at the beginning of a multi-component batch process the multi-component profiled member is measured and the measured characteristic values are compared to nominal characteristic values of the multi-component profiled member, wherein, upon coinciding of the nominal characteristic values and the actual characteristic values, at a plurality of predetermined locations the actual temperature values and the actual pressure values within at least one individual extruder are detected, wherein the actual pressure values are averaged, and wherein the actual temperature values and the actual averaged pressure values are compared to the nominal temperature values for pressure and temperature for the extruded material, known for the selected value of the number of revolutions of the individual extruder and for the selected characteristic value of the multi-component profiled member, in order to check the identity of the material present within the extruder with the desired material to be processed.

6. A method according to claim 5, wherein a correlation of the actual averaged pressure values and the actual temperature values, when the actual mass flow is identical to the nominal mass flow, to known material-typical averaged pressure values and actual temperature values, determined for known materials within the extruder in connection with a certain mold nozzle, is carried out for determining the material present in the extruder.

* * * * *